Feb. 1, 1949.   V. A. LARSEN   2,460,587
AIRPLANE DEVICE
Filed Nov. 9, 1942   4 Sheets-Sheet 1
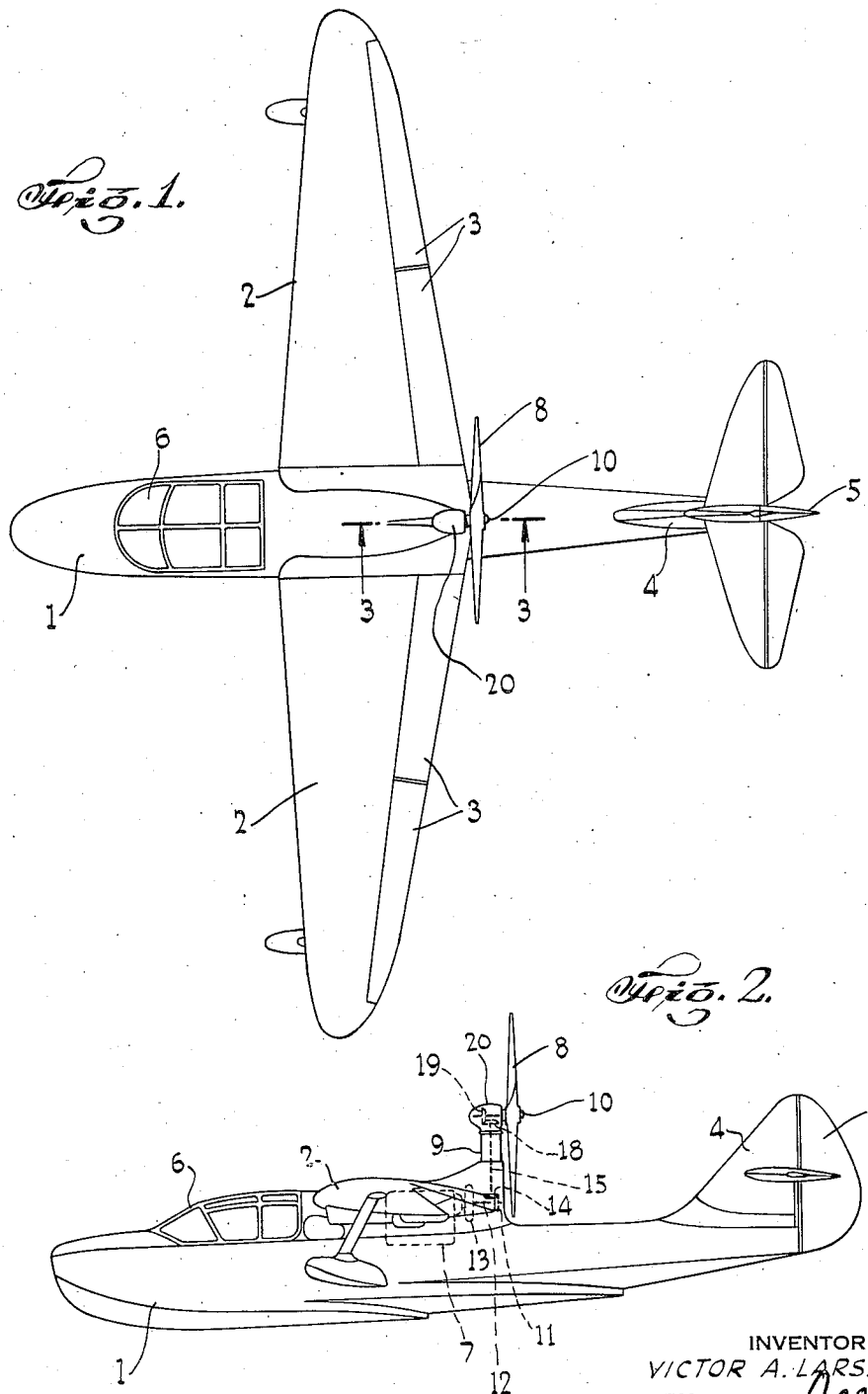
INVENTOR
VICTOR A. LARSEN
BY
ATTORNEYS

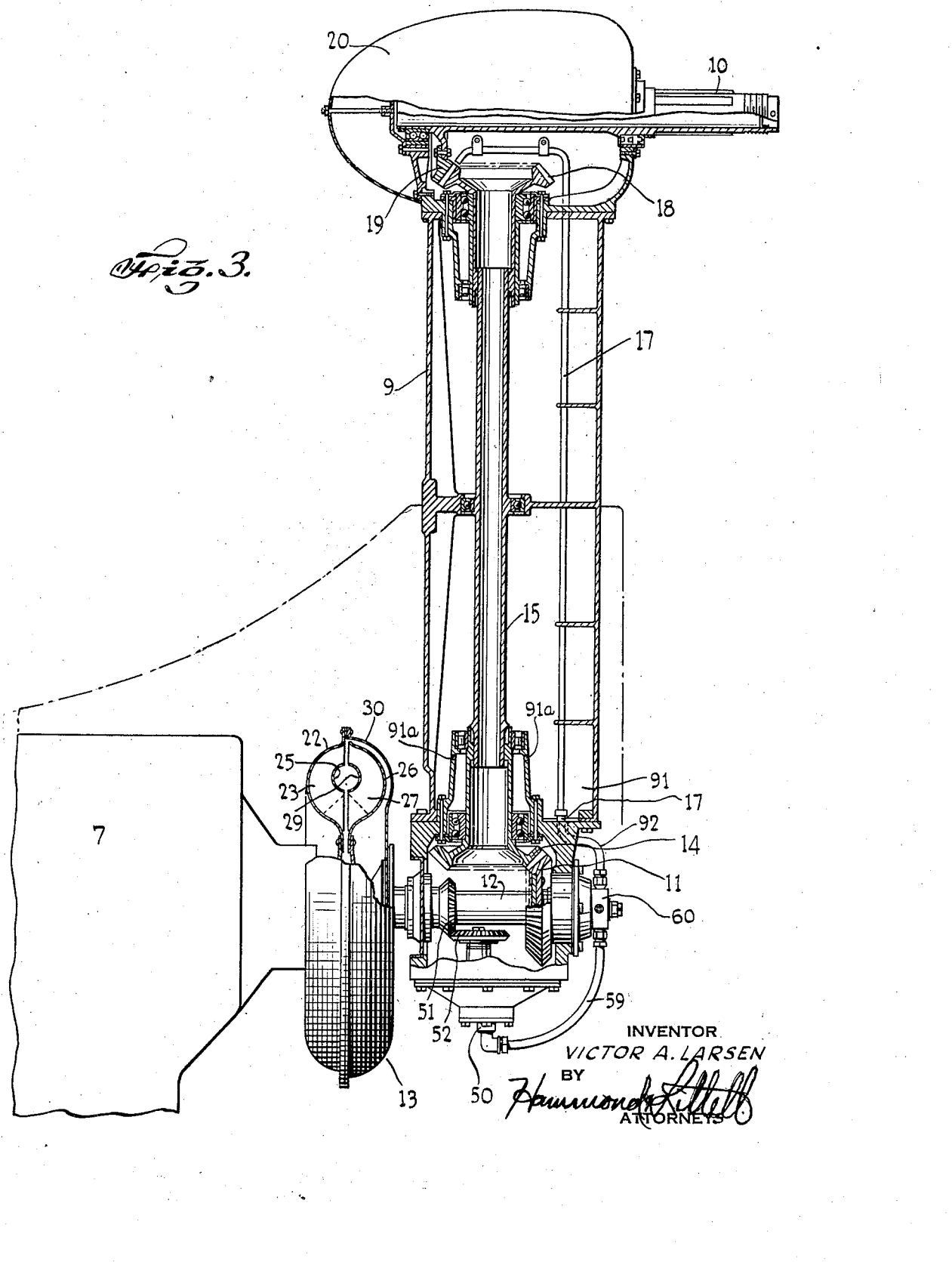

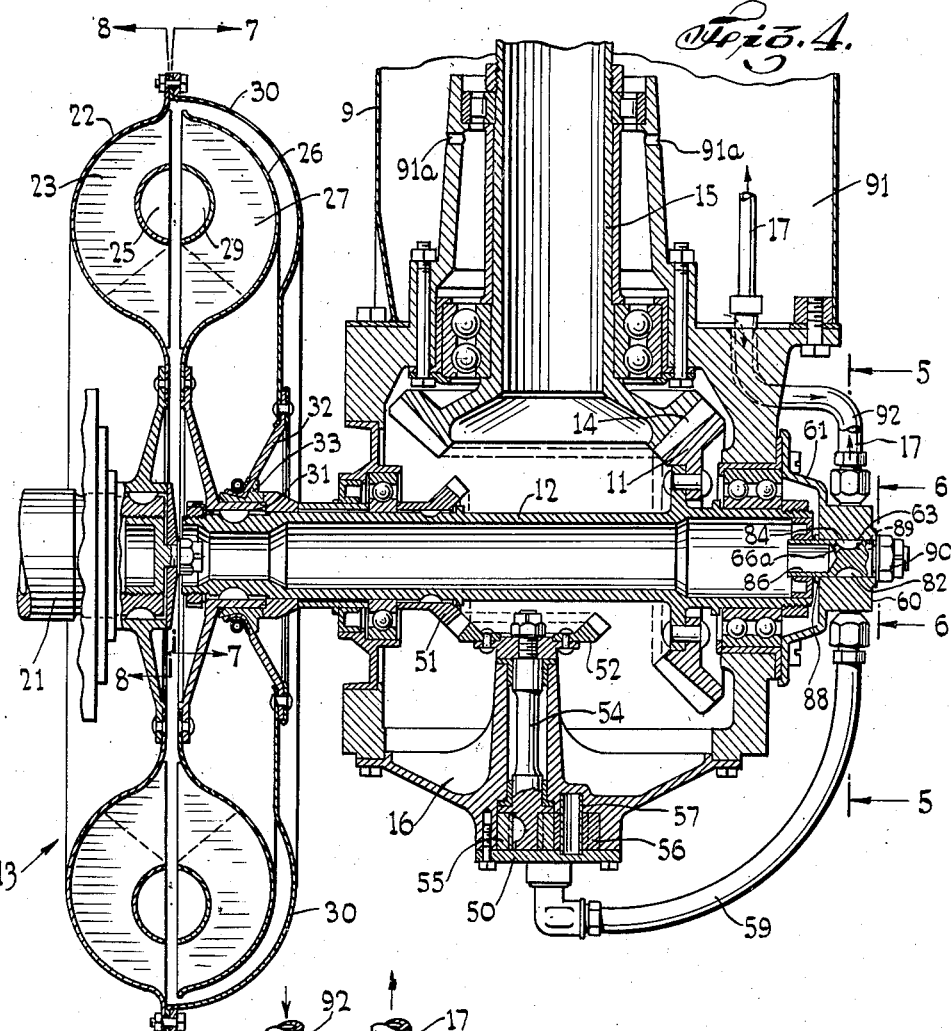
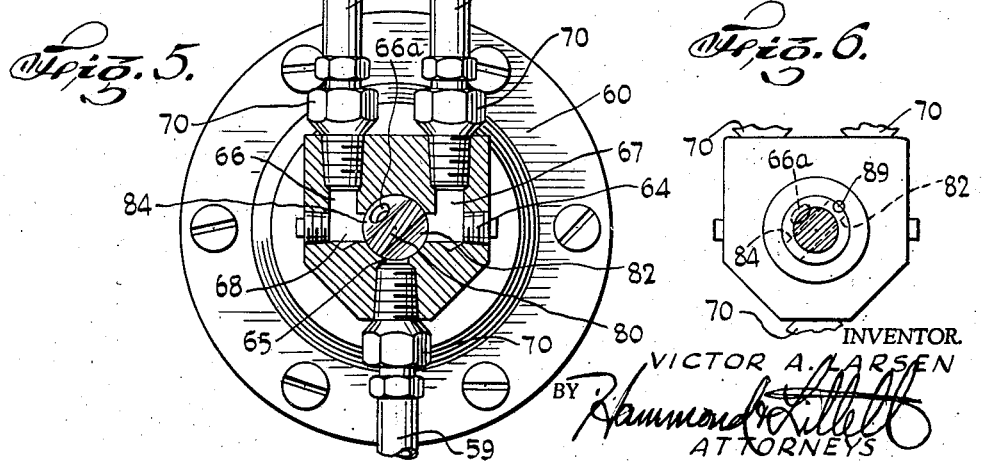

Feb. 1, 1949.  V. A. LARSEN  2,460,587
AIRPLANE DEVICE

Filed Nov. 9, 1942  4 Sheets-Sheet 4

INVENTOR
VICTOR A. LARSEN
BY
ATTORNEYS

Patented Feb. 1, 1949

2,460,587

UNITED STATES PATENT OFFICE 2,460,587

AIRPLANE DRIVE

Victor A. Larsen, Altadena, Calif., assignor, by mesne assignments, to Gustav Hanke, Massapequa, N. Y.

Application November 9, 1942, Serial No. 464,958

8 Claims. (Cl. 170—135.75)

This invention relates to drive means for airplanes. More particularly, it relates to drive means used in those airplanes in which the engines and the propellers are located at a distance from one another, and in which the axis of the propeller may be out of line with the axis of the crankshaft of the engine, as described, for example, in Patent No. 2,359,652, of which this is a continuation-in-part.

Various attempts have been made to build airplanes in which the engine and the propeller are located at a distance from one another, for example, where the engine is located in the fuselage and the propeller, or propellers are located in or about the wing structure. However, no airplane of such design previously tried has been found to be satisfactory. All airplanes of this design which have been proposed and built experimentally rely on remote driving means, such as gearing, drive shafts, chains, and the like, to transmit the driving power to the propellers. The use of elements of this type has heretofore invariably resulted in the introduction of play or lost motion between the engine and the propeller and augmented the vibrations of the engine and the backlash from the propeller. This has caused airplanes of this design to be subject to a great deal of objectionable vibration; much more than airplanes in which the propeller is mounted directly on the engine crankshaft.

It is an object of this invention to provide an airplane construction of the type in which the engine and the propeller may be out of line with the axis of the crankshaft and driven by remote driving means, without the objectionable vibrations inherent in prior constructions.

Another object of this invention is to provide a remote drive means for airplanes in which the pulsing vibrations normally transmitted by the engine to the propeller, are dampened to a minimum by use of a fluid drive connection in the drive means between the engine and the propeller.

Another object of the invention is to provide a remote drive means for airplanes in which engine vibrations are absorbed and kept from being transmitted to the airplane and propeller drive shafts by means of a fluid drive connection in the drive means at a point between the engine and the propeller.

Another object of the invention is to provide a remote drive means for use in airplanes of this type in which oscillating or swaying vibrations may be present in the motions of a crankshaft without being transmitted to a shaft driven thereby through a flexible coupling.

Another object of the invention is to provide a fluid drive connection between the driving and driven shaft of an engine in which there is no connection between the driving and driven shaft by which vibrations may be transmitted from one shaft to the other.

Various other objects and advantages of the invention will become apparent to those skilled in the art as the description proceeds.

In the drawings which illustrate an airplane embodying features of this invention:

Figure 1 is a plan view of a single engine, single propeller airplane in which the engine is mounted back of the wing structure and out of line with the engine.

Figure 2 is a side view of the airplane illustrated in Figure 1.

Figure 3 is a sectional view substantially on the line 3—3 of Figure 1 showing one form of remote driving connection and flexible coupling in the drive means between the engine and the propeller.

Figure 4 is a sectional view showing in greater detail the form of fluid drive coupling shown in Figure 3.

Figure 5 is a sectional view substantially on the line 5—5 of Figure 4 showing the detailed construction of the oil distributor.

Figure 6 is a sectional view substantially on the line 6—6 of Figure 4 showing in detail the core plug keyed to the oil distributor casting.

Figure 7:
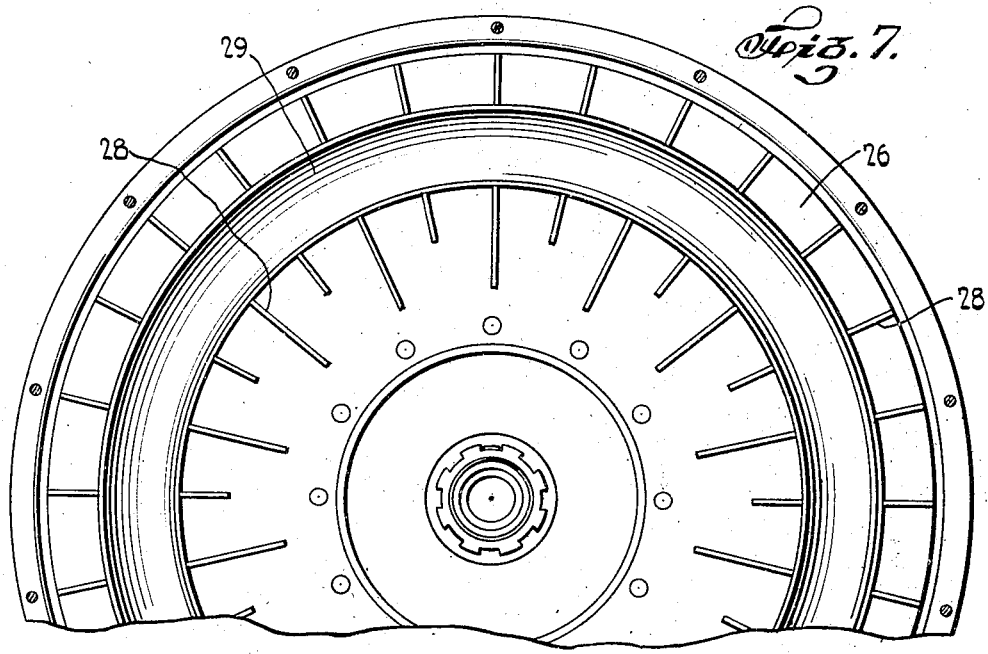
Figure 7 is a sectional view substantially on the line 7—7 of Figure 4 showing the impelled or driven member.
Figure 8:
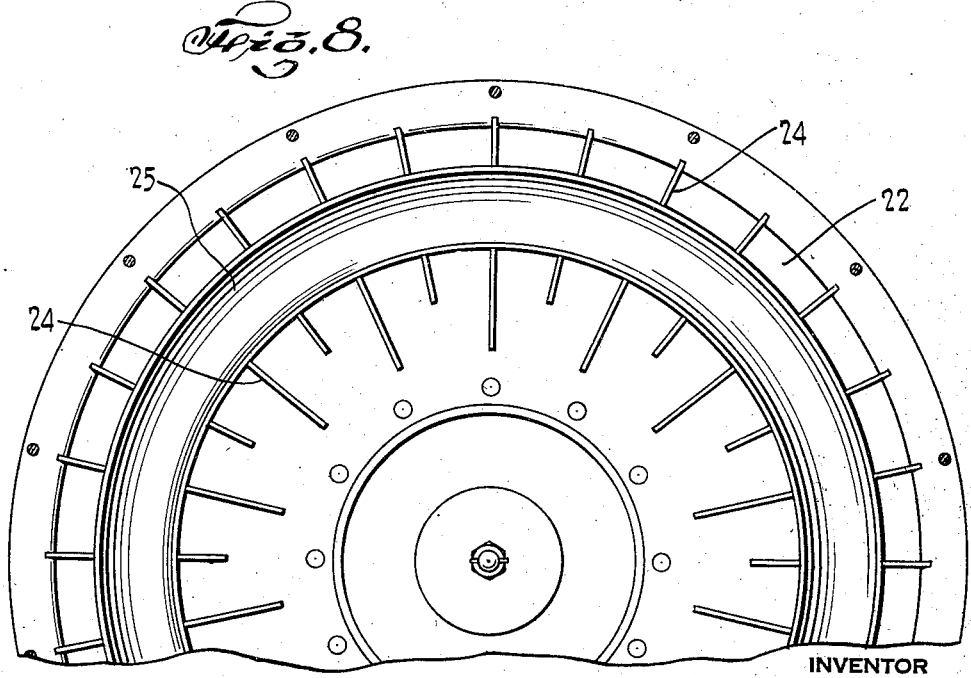
Figure 8 is a sectional view substantially on the line 8—8 of Figure 4 showing the impeller or driving member of the fluid drive.

In the airplane chosen to illustrate the drive means of this invention, Figures 1 and 2, the airplane consists of a fuselage 1 provided with the usual wings 2, ailerons 3, tail 4, rudder 5, and elevators as in the usual design of airplane body construction. The cockpit 6 is located in the front of the fuselage with the engine mounted in the fuselage to reduce wind resistance and the propeller mounted in the rear.

The engine 7 is located within the fuselage and at the rear of the cockpit and drives the propeller 8, which is preferably located above and at the rear of the wings of the airplane, through a remote driving connection. This connection extends from the engine upwardly through the housing 9 to a stud shaft 10 on which the propeller 8 is mounted.

While this type of remote drive may take various forms, in the embodiment illustrated it consists of a beveled ring gear 11, mounted on a shaft 12 which is driven from the engine 7 through a form of flexible coupling 13, which, in the illustrated form, is a fluid drive coupling. This drive transmits a rotary motion from the crankshaft of the engine 7 to the ring gear 11. The gear 11 in turn drives a similar beveled ring gear 14 keyed to the bottom end of the vertical shaft 15 which is mounted and supported for rotary movement in the housing 9. The usual roller or ball bearings are used to reduce friction. A forced feed lubricating system picks up oil and forces it through conduit 17 to lubricate the upper gearing assembly 18 and 19, and floods the various bearings in the housing 9 with oil. The beveled ring gear 18 mounted and keyed to the top of the vertical shaft 15 drives the stud shaft 10 through ring gear 19 to which it is keyed. The shaft 10 in turn drives the propeller 8 mounted thereon. A housing 20 encloses the upper gear assembly.

While the airplane illustrated in the drawing shows only one propeller and one engine, it will be understood that two or more propellers may be driven from the same engine by providing two or more driving assemblies of the type shown. These may be made to go off at an angle to the line of the engine crankshaft; or two or more engines may be provided, each driving one or more propellers.

In order to prevent the transmission of vibrations from the engine to the drive means, the propeller and the airplane through the supporting structure or from the propeller back to the engine because of backlash in the driving connections, a flexible coupling is used to connect the crankshaft of the engine 7 with the driven shaft 12 of the propeller drive means. The construction of this coupling is such that it will absorb and eliminate pulsing and oscillating vibrations. The maximum absorption and elimination of vibrational forces is possible by such means when the crankshaft and the driven shaft are held in spaced relationship with one another so that any swing or oscillation in the one shaft will not be transmitted to the other shaft and will not cause the shafts to contact one another. In Figure 4, which illustrates a preferred type of coupling arrangement for accomplishing this result, the driven shaft 12, although mounted in axial alignment with the crankshaft 21, is held in definite spaced relationship thereto and is not connected with the crankshaft 21 except through the flexible fluid drive connection, so that considerable play is possible without either shaft touching or affecting the other.

In this embodiment of my invention, an impeller member 22 is keyed to the end of the crankshaft 21 and acts as the engine flywheel, although a separate flywheel may be provided if desired. An impelled or driven member 26 is mounted on the driven shaft 12 which is hollow. A housing 30 extends from the outer edge of the impeller member 22 and is flexibly and rotatably connected with the shaft 12. The impeller member has a semicircular face 23 provided with a series of vanes 24 and which may, if desired, be provided with a central open portion 25. The driven member 26 is secured firmly to the shaft 12 and is shaped similarly to member 22 with a semicircular recess portion 27 having vanes 28 and, if desired, a central open portion 29 therein. The impeller 22 and impelled member 26 are so arranged with respect to one another that when oil or other driving fluid is in the space between the two members, rotation of the impeller 22 and its vanes 24 will set up a rotational movement of the oil or other driving fluid which in turn will be transmitted to vanes 28 of the driven member 26 and cause the driven member to rotate by the transmission of power through the fluid connection between the two members. This type of power transmission has been disclosed in various patents, for example, in the Fottinger United States Letters Patent No. 1,199,364, granted September 26, 1916.

The housing 30 cooperates with the driving member 22 to enclose the driven member 26 and to hold driving fluid in the coupling. It is connected at one end to member 22 and is in slidable contact with the hub 31 of the driven member 26 at the other end through a flexible member 32. The annular flexible portion 32, which may be of an oil resistant fabric, rubber or artificial rubber, such as neoprene, is fastened to the inner edge of the housing 30 and to a ring member 33 slidably mounted on hub 31. The hub 31 is splined to the shaft 12 to drive this shaft. The member 32 is preferably made of material that will not be destroyed by the oil or other driving fluid used in the drive coupling. The member 32, forming a flexible connection between the housing 30 and the hub 31 of the shaft 12, absorbs all vibrational force and prevents vibrations from being transmitted from the crankshaft to the driven shaft 12 through the connecting housing structure, or from the driven shaft back to the crankshaft. While the member 32 has been shown in a particular location, it will be understood that it could be located in other places and still prevent the transmission of vibrations from one shaft to the other.

The forced feed lubricating system illustrated includes a sump 16 for collecting the oil, an oil pump 50 for forcing the oil from the sump 16 to a desired point in the lubricating system, a distributor 60, and suitable conduits. The sump 16 is preferably positioned at the base of the housing which encloses the driven shaft 12 and the ring gears 11 and 14, and the pump 50 is driven from the shaft 12 through a beveled ring gear 51 keyed to shaft 12. The gear 51 cooperates with beveled ring gear 52 keyed to the upper end of the shaft 54, and the pump gear 55 is secured to the lower end of shaft 54. Gear 56 mounted on stud shaft 57 in the pump casing meshes the gear 55 to pump the oil from the sump 16 through conduit 59 to the distributor 60.

The distributor assembly is mounted in a cover plate 61 which closes the end of the housing for the shaft 12, and consists of a hub-shaped casting provided with an axial bore 63, and passages 65, 66, 67 and 68 in a plane perpendicular to the bore and communicating therewith. Plugs 64 are screwed into both ends of passage 68 and cause the communicating passages to take on a Y shape. Connector elements 70 are screwed into the ends of each of the three remaining passages to provide easy means for connecting conduits thereto. A plug 80 provided with cutout portions 82 and 84 and a hollow tube-like end portion 86 is secured in bore 63 of the casting. The plug is held in fixed position in the bore by means of a nut 90 which is threaded onto one end of the plug and abuts the outer end of the casting and pulls a shoulder 88 of the plug into abutment with the other side of the casting wall. The plug is kept from rotating in the bore by means of a pin 89 which keys it to the casting and keeps the recessed portions of the plug in alignment with passages 66 and 67 of the casting.

When the parts of the distributor are in assembled position, the connector in passage 65 is connected to the conduit 59. This permits the oil pumped from the sump 16 by the action of the gear pump 50 to be brought into the distributor through passage 65, cutout portion 82 and up into conduit 17 through passage 67. Conduit 17 passes up through housing 9 and causes oil passing therethrough to be discharged onto the ring gears 18 and 19. From this point, the oil with the aid of a gravity feed drips down through the various bearings supporting shaft 15 in housing 19, onto ring gears 11 and 14 and 51 and 52, and finally back into sump 16.

Means are also provided to control the amount of driving fluid in the fluid drive coupling to insure a proper amount of fluid at all times. This consists of a reservoir 91 located at the base of the housing for the vertical shaft 15 and having a conduit 92 connected thereto flowing oil from the reservoir into the passage 66 and thence through the hole 66a in the plug 80 and into the hollow shaft 12. Overflow holes 91a permit excess oil in the reservoir 91 to flow out into the housing for the shaft 12. The level of the driving fluid in the reservoir 91 is located so that oil will accumulate therein to the level of the overflow holes 91a when the engine is in operation, and during those periods when the engine and, therefore, the impeller, is at rest, the oil will fill the fluid drive coupling to approximately the top of the housing formed by the impeller member 22 and the housing member 30. If the fluid is kept within these limits the open communicating passages and fluid head will serve to insure that the amount of fluid within the fluid drive coupling is sufficient for starting without too much loss of power. When the engine gets up speed centrifugal force will insure that the space between the vanes 24 of the impeller and the vanes 28 of the impelled member will be filled with oil, and the development of excessive pressure will be prevented by the fact that excess oil can feed back through the hollow driven shaft 12, passage 66a and conduit 92 into the reservoir 91.

At the same time by so locating the overflow from the reservoir 91, such as the holes 91a, on about the level of the top of the fluid coupling housing, relief from expansion and contraction of the oil under heat or cold is assured as expansion of the oil will merely cause it to overflow from the reservoir 91 into the sump 16 and contraction will draw more oil from the reservoir 91 into the fluid drive housing; also, if pressure develops through other causes this is automatically relieved by the fact that the oil may flow in either direction through the hole 66a in the plug 80. The oil in the reservoir 91 will also make up for slight leakages of oil from the system should they occur in flight or for other causes.

While I have described the preferred forms of embodiment of the various parts constituting my invention, it will be understood that other forms of embodiment or equivalent parts can be used for those specifically described, and that I intend that all such modifications and changes are within the scope of the appended claims.

I claim:

1. In an airplane, an engine, a propeller located at a point remote from the engine and out of line with the engine crankshaft, driving means between the engine and the propeller whereby the propeller may be driven from the engine, including an impeller member having recesses therein for the reception of a driving fluid and vanes for setting up a rotational movement of said driving fluid, an impelled member for receiving a driving fluid and vanes to be impelled by a driven fluid, a driving fluid between said impeller member and said impelled member, and a housing to prevent escape of said driving fluid, said housing being mounted at one end to said impeller and in slidable contact with the impelled member at the other end, and flexible means provided in said housing to prevent the transmission of vibrations from one point of contact to the other through said housing.

2. In an airplane, an engine, a propeller located at a point remote from the engine and out of line with the engine crankshaft, driving means between the engine and the propeller whereby the propeller may be driven from the engine, including an impeller member connected to the engine having recesses therein for the reception of a driving fluid and vanes for setting up a rotational movement of said driving fluid, an impelled member connected to a hollow driven shaft for receiving a driving fluid and vanes to be impelled by a driving fluid, a driving fluid between said impeller member and said impelled member, a housing to prevent escape of said driving fluid, said housing being mounted at one end to said impeller and in slidable contact with the hollow driven shaft of the impelled member at the other end, means provided in said structure to prevent the transmission of vibrations from one point of contact to the other through said housing comprising an imperforate flexible diaphragm between said housing and said hollow driven shaft, and means for automatically regulating the pressure in said housing with respect to atmospheric pressure when said driving means is in operation, comprising an oil reservoir normally above the hollow driven shaft and an open communication through which oil may flow in either direction between said reservoir and said hollow driven shaft.

3. In an aircraft, an engine, a propeller located at a point remote from the engine and out of line with the engine crankshaft, a driving means between the engine and the propeller whereby the propeller may be driven from the engine, including an impeller member having recesses therein for the reception of a driving fluid and vanes for setting up a rotational movement of said driving fluid, an impelled member for receiving a driving fluid and vanes to be impelled by a driven fluid, a driving fluid between said impeller member and said impelled member, a housing to prevent escape of said driving fluid, said housing being fixedly mounted on said impeller and in slidable contact with said impelled member and provided with flexible means in its structure to prevent the transmission of vibrations from the impeller to the impelled member through the housing structure, and means for controlling the amount of driving fluid in the housing to insure a proper amount of fluid in the housing at all times.

4. In an aircraft, an engine, a propeller located at a point remote from the engine and out of line with the engine crankshaft, a driving means between the engine and the propeller whereby the propeller may be driven from the engine, including an impeller member having recesses therein for the reception of a driving fluid and vanes for setting up a rotational movement of said driving fluid, an impelled member for receiving a driving fluid and vanes to be impelled by a driven fluid, a driving fluid between said impeller member and said impelled member, a driven shaft fixedly mounted to said impelled member, a distributor valve, a housing to prevent escape of said driving fluid, and a driving fluid reservoir in communication with said housing through said driven shaft and said distributor valve at the end thereof.

5. In an aircraft, an engine, a propeller located at a point remote from the engine and out of line with the engine crankshaft, driving means between the engine and the propeller whereby the propeller may be driven from the engine, including an impeller member having recesses therein for the reception of a driving fluid and vanes for setting up a rotational movement of said driving fluid, an impelled member for receiving a driving fluid and vanes to be impelled by a driven fluid, a driving fluid between said impeller member and said impelled member, a housing to prevent escape of said driving fluid, said housing being fixedly mounted on said impeller in slidable contact with said impelled member and provided with flexible means in its structure to prevent the transmission of vibrations from the impeller to the impelled member through the housing, means for automatically regulating the pressure in said housing with respect to atmospheric pressure when said driving means is in operation, said means controlling the amount of driving fluid in the housing to insure a proper amount in the housing at all times.

6. In an aircraft, an engine, a propeller located at a point remote from the engine and out of line with the engine crankshaft, driving means between the engine and the propeller whereby the propeller may be driven from the engine, including an impeller member having recesses therein for the reception of a driving fluid and vanes for setting up a rotational movement of said driving fluid, an impelled member for receiving a driving fluid and vanes to be impelled by a driven fluid, a driving fluid between said impeller member and said impelled member, a housing to prevent escape of said driving fluid, a flexible wall in said housing, and a driving fluid reservoir in constant two-way communication with said housing through said driven shaft and said distributor valve at the end thereof.

7. In an aircraft, an engine, a propeller located at a point remote from the engine out of line with the engine crankshaft, a driving means between the engine and the propeller whereby the propeller may be driven from the engine, including an impeller mounted on the end of the crankshaft of the engine for rotation therewith, said impeller having recesses for receiving a driving fluid and vanes for setting up rotational movement of said driving fluid, a driven shaft mounted in substantial alignment with the crankshaft and in spaced relationship thereto, an impelled member mounted on the end of said driven shaft for rotation therewith, and in spaced relationship to said impeller, said impelled member being provided with recesses for receiving a driving fluid and vanes to be impelled by said fluid, a driving fluid between said impeller and said impelled member, and a housing cooperating with said impeller to enclose said impelled member to prevent escape of said driving fluid, said impelled member being in sliding engagement with said impeller member and provided with an annular flexible wall portion, separating that portion of the housing which contacts the impeller from that portion in slidable contact with the impelled member to prevent transmission of vibrations between the impeller and impelled member through said housing.

8. An engine crankshaft, the axis of which is horizontal in normal position, a vertical drive shaft driven from the engine crankshaft, a propeller located above the engine and driven from the vertical drive shaft, driving means between the engine and the propeller whereby the propeller may be driven from the engine, including an impeller member having recesses therein for the reception of a driving fluid and vanes for setting up a rotational movement of said driving fluid, an impelled member for receiving a driving fluid and vanes to be impelled by a driven fluid, a driving fluid between said impeller member and said impelled member, and a housing to prevent escape of said driving fluid, said housing being mounted at one end to said impeller and in slidable contact with the impelled member at the other end, and flexible means in said housing to prevent transmission of vibrations from one point of contact to the other through said housing.

VICTOR A. LARSEN.

REFERENCES CITED

The following references are of record in the file of this patent:

UNITED STATES PATENTS

| Number | Name | Date |
|---|---|---|
| 1,276,847 | Wilfley | Aug. 27, 1918 |
| 1,389,562 | Schneider | Aug. 30, 1921 |
| 1,747,334 | Sundstedt | Feb. 18, 1930 |
| 1,750,681 | Morse | Mar. 18, 1930 |
| 1,760,397 | Coats | May 27, 1930 |
| 1,780,613 | Bauer | Nov. 4, 1930 |
| 1,873,688 | Walker | Aug. 23, 1932 |
| 1,881,723 | Lee | Oct. 11, 1932 |
| 2,003,975 | Rand | June 4, 1935 |
| 2,004,279 | Fottinger | June 11, 1935 |
| 2,156,288 | Holliday | May 2, 1939 |
| 2,263,996 | Kimberly | Nov. 25, 1941 |
| 2,285,050 | Pezzillo | June 2, 1942 |
| 2,359,652 | Larsen | Oct. 3, 1944 |
| 2,359,930 | Miller | Oct. 10, 1944 |
| 2,381,187 | Swift | Aug. 7, 1945 |

FOREIGN PATENTS

| Number | Country | Date |
|---|---|---|
| 448,560 | Great Britain | Dec. 14, 1934 |
| 452,922 | Great Britain | Sept. 1, 1936 |
| 621,413 | Germany | Oct. 10, 1944 |